(No Model.) 2 Sheets—Sheet 1.

J. A. ULMAN & V. L. EMERSON.
LUMBER TRUCK.

No. 577,798. Patented Feb. 23, 1897.

WITNESSES:—
Lee I. Van Horn.
Charles B. Mann Jr.

INVENTORS:—
Jacob A. Ulman
Victor L. Emerson
By Chas. B. Mann
ATTORNEY (No Model.) 2 Sheets—Sheet 2.

J. A. ULMAN & V. L. EMERSON.
LUMBER TRUCK.

No. 577,798. Patented Feb. 23, 1897.

WITNESSES:—
Lee J. Van Horn.
Charles B. Mann Jr.

INVENTORS
Jacob A. Ulman
Victor L. Emerson
By Chas. B. Mann
ATTORNEY.

UNITED STATES PATENT OFFICE.

JACOB A. ULMAN AND VICTOR L. EMERSON, OF BALTIMORE, MARYLAND.

LUMBER-TRUCK.

SPECIFICATION forming part of Letters Patent No. 577,798, dated February 23, 1897.

Application filed July 28, 1896. Serial No. 600,768. (No model.)

*To all whom it may concern:*

Be it known that we, JACOB A. ULMAN and VICTOR L. EMERSON, citizens of the United States, residing at Baltimore, in the State of Maryland, have invented certain new and useful Improvements in Lumber-Trucks, of which the following is a specification.

This invention relates to lumber-trucks designed for use on tracks in dry-kilns, but which may be used for carrying any other material and employed wherever trucks may be required.

One object of the invention is to provide a light-weight truck having two or more wheels in alinement.

Another object is to make provision for carrying the load on seats which are substantially in a line vertical with respect to the axis of the wheels instead of on a frame which the load subjects to cross strains.

Another object is to provide a construction that will afford for a given number of wheels a greater number of seats for cross-beams to be placed under the load of material being carried; and still another object is to provide a longitudinal adjustment between the alined wheels of the truck, whereby the wheels may be set nearer together or farther apart to suit different lengths of lumber.

In order to make the invention more clearly understood, we have shown in the accompanying drawings certain means for carrying the same into practical effect, without, however, intending to limit our invention to that particular construction.

Figure 1:
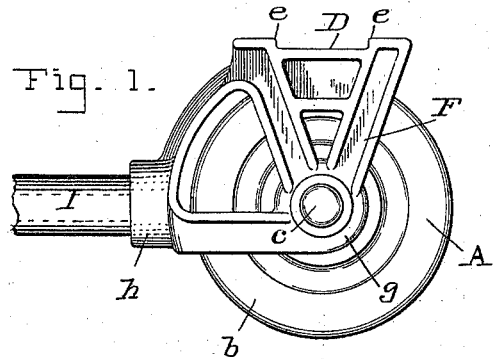
Figure 2:
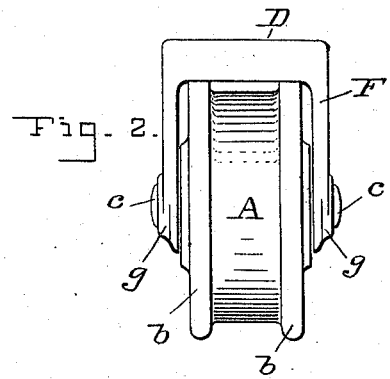
Figure 3:
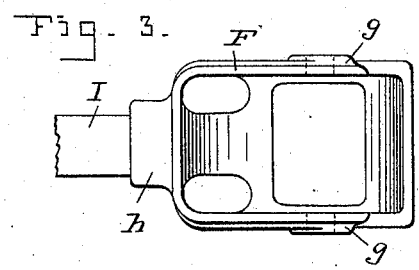
Figure 4:
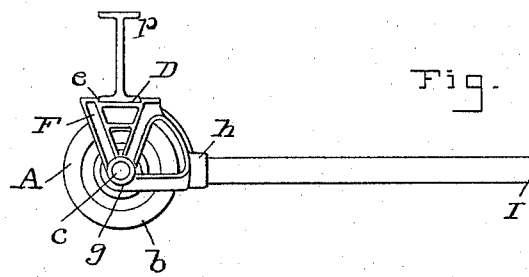
Figure 5:
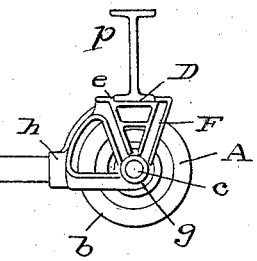
Figure 6:
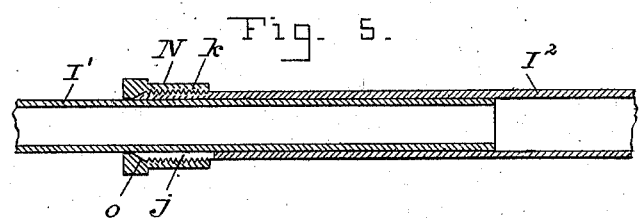
Figure 6:
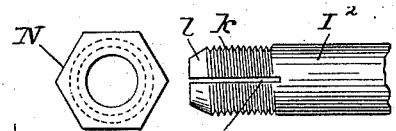
Figure 7:
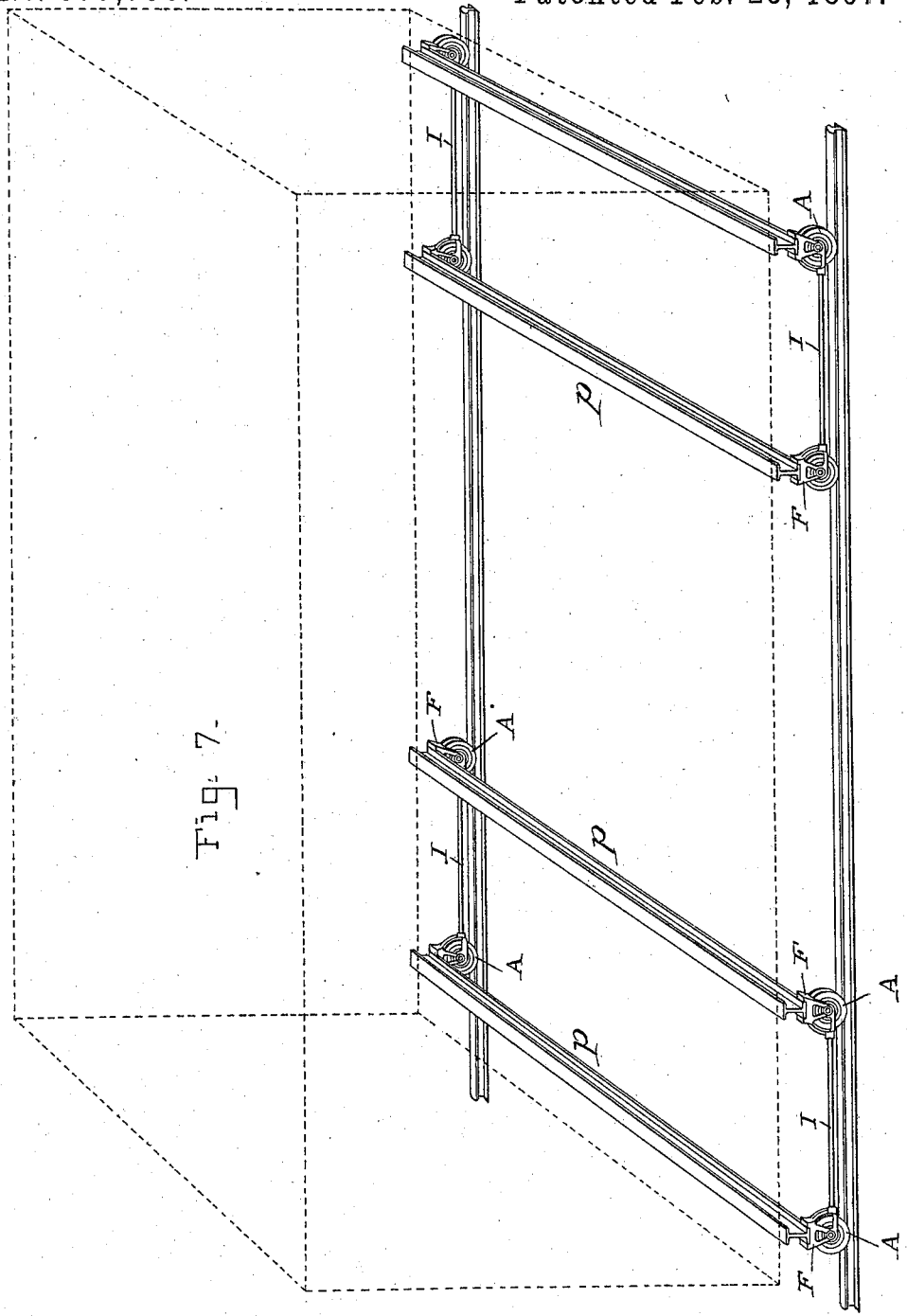

In the drawings, Figure 1 is a side view of one truck-wheel and seat directly above the axis of the wheel. Fig. 2 is an end elevation of same. Fig. 3 is an inverted or bottom plan of the truck-seat, the wheel being omitted. Fig. 4 is a side view of one complete truck having two alined wheels, and shows an end view of an I-beam supported over each wheel. Fig. 5 shows a sectional view of one form of construction for an adjustable connection that may be employed in each truck between the two alined wheels. Fig. 6 shows a hexagon screw clamp-collar and the outside split tube belonging to the particular adjustable connection shown in Fig. 5. Fig. 7 is a perspective view showing the track-rails, four trucks placed in proper position thereon, and I-beams on the trucks for a load of lumber. In practice we prefer to have the I-beams long enough for their ends to project beyond the trucks.

Referring to the drawings, the letter A designates one of the wheels, which in this instance has two flanges $b$, enabling the wheel to traverse a rail without liability of slipping off at either side. Any other form, however, may be used. A shaft or axle $c$ passes through the center of the wheel and supports a seat or frame over the wheel.

An important feature of the invention consists of a separate or independent frame supported over each wheel and capable of holding a beam substantially in a line vertical with respect to the axis of the wheel. Any preferred construction of frame may be employed to sustain the seat over the shaft or axle $c$. In the present instance we show a suitable metal frame F, which sets astride of the wheel and has two bearings $g$, which engage both ends of the said shaft or axle near the wheel-hub. The seat D is on the frame and stops or shoulders $e$ are at each side of the seat to prevent a beam $p$ from slipping off. The frame also has means of any suitable kind, such, for instance, as a socket $h$, for the reception of a suitable connection, such as a bar or, preferably, a piece of pipe I, which thus connects two of the frames and two wheels together, as in Fig. 4, and thereby forms one complete truck. It will be seen that the two wheels of each truck are in alinement and revolve in the same plane, and that the connections I will have practically no load to carry. The trucks would be operative if the seat for carrying the I-beams were shifted slightly to one side of a line vertical over the axis of the wheels, but any such shifting of the load from a line vertical over the axles will only tend to cause a cross strain on the connections and thereby necessitate a stronger construction, which, of course, would increase the weight of the truck—a thing we desire to avoid.

In practice it is preferable to use four trucks, like Fig. 4, to carry a load when arranged with four beams $p$, as shown in Fig. 7, so that there will be four cross-beam supports under the load of lumber.

We have found by practical experience that where there are but two cross-beams to support the ordinary sixteen-foot lengths of lumber the lumber at the ends and middle will sag down badly, especially when conveying the lumber through drying-kilns for the purpose of drying.

We contemplate a connection that shall have a variable longitudinal adjustment between the two wheels of the truck, as shown in Figs. 5 and 6. Here we have shown two tubes I' and I², one smaller than the other, so as to slide telescope fashion. The end of the larger tube has slits $j$ and is exteriorly screw-threaded, as at $k$, and its extremity is beveled off like the frustum of a cone, as at $l$. A screw clamp-collar N fits on the slitted end of the larger tube and has a contracted end which is provided with an inner bevel $o$, coincident with the beveled extremity $l$ on said tube. By loosening the clamp-collar N the two tubes I' I² may be extended or contracted so as to lengthen the connection or shorten it. When the length of the connection between the two wheels has been adjusted to suit, the screw clamp-collar N may be tightened and thereby the slit end of the outer tube will be caused to grip the inner tube tightly.

The clamp-collar has a hexagon head to receive a wrench. Obviously other constructions may be employed to provide a longitudinal adjustment in the connection between the two wheels.

Heretofore it has been the custom to use trucks which carry the supporting-beam, such as the I-beam shown in the drawings, resting on the frame of the truck between the two wheels. Such construction requires a very heavy frame to support the weight of the load.

Where more than four trucks have been used heretofore, it sometimes happened that in going over uneven places in the track the load would be lifted off of some of the center trucks, which thereupon would shift their position and become deranged on the track under the load and cause much trouble. These and other objections are entirely overcome in our invention.

We are aware that lumber-trucks have been constructed with two longitudinal beams, one on each side of two wheels, for carrying a load resting on said beams, but to our knowledge no truck has been constructed with two wheels in alinement and to carry the load only over the axis of the wheels and without causing a cross strain on the connections between said wheels.

We have shown the trucks to consist of two wheels each, but it is obvious that two or more wheels may be connected together in alinement in the same way as we have here shown two.

Having thus described our invention, what we claim is—

1. A truck comprising two wheels in alinement; a shaft or axle in each wheel with ends projecting at opposite sides; two separate and independent frames each one astride of a different wheel and engaging both ends of the shaft or axle thereof and each frame having on top a seat for a cross-beam; and a connection uniting said two frames and attached to them below said top seats, for keeping the wheels rigidly alined.

2. The combination of two trucks parallel with each other each truck having two or more wheels in alinement; a separate frame over each wheel and having a seat, and a rigid connection between the said alined frames; and cross-beams connecting from one truck to the other and resting on the seats of said frames—said cross-beams for the purpose of supporting the load.

3. A truck having two or more wheels which are in alinement; two separate frames each supported over a different one of said wheels and each adapted to carry a load substantially in a line vertical with respect to the axis of the wheel over which it sets; a telescopic tube uniting said frames, and a screw clamp-collar to hold the said telescopic tube at any position of adjustment.

In testimony whereof we affix our signatures in the presence of two witnesses.

JACOB A. ULMAN.
    VICTOR L. EMERSON.

Witnesses:
 CHARLES B. MANN, Jr.,
 CHAPIN A. FERGUSON.